Figure 1:
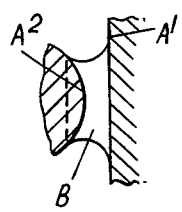

Dec. 8, 1964   R. E. REASON ETAL   3,160,237
DAMPING DEVICE

Filed Aug. 11, 1961   2 Sheets-Sheet 1

Inventors
R. E. Reason
G. O. Rawstron
R. C. Spragg
By
Attorneys

United States Patent Office 3,160,237
Patented Dec. 8, 1964

3,160,237
DAMPING DEVICE
Richard Edmund Reason, George Ormerod Rawstron, and Robert Claude Spragg, Leicester, England, assignors to Rank Precision Industries Limited, trading as The Rank Organisation Rank Taylor Hobson Division, Leicester, England, a British company
Filed Aug. 11, 1961, Ser. No. 130,921
Claims priority, application Great Britain, Aug. 16, 1960, 28,380/60
8 Claims. (Cl. 138—87)

This invention relates to viscous coupling devices, employing a viscous liquid as transmission medium, for transmitting or controlling mechanical movements, for example for damping the movement of one member relatively to another or for reducing risk of damage by shock or for accurately transmitting small movements from one member to another.

The present invention has for its object to provide an improved viscous coupling device which will satisfactorily and efficiently transmit or control small movements with the use of only a small quantity of the liquid.

In the viscous coupling device according to the present invention, two relatively movable members are coupled to one another by means of a drop of viscous liquid extending between the surfaces of the two members, and the two surfaces have such shapes that in the direction of relative movement there is a position of shortest distance between the surfaces, at which the liquid drop is retained in contact with the surfaces by its surface tension, the arrangement being such that relative movement between the two members will subject the drop to shear stress tending by virtue of the viscosity of the liquid to resist such relative movement.

Means are preferably provided for limiting the extent of the relative movement to a distance less than the size of the liquid drop, thereby minimising the risk of disruption of the drop which might otherwise occur with excessive relative movement between the members.

In one useful application of the coupling device, one of the two members is movable and the other is restrained against similar movement, and the shear stress developed in the liquid by movement of the first member exerts a damping force on such movement.

In another application, the two members are so mounted as to be capable of movement in the same direction, whereby the shear stress developed in the liquid by movement imparted to one of the members will tend to cause the second member to follow the movement of the first member. In such case, when the movement imparted to the first member is at least in part oscillatory, the arrangement is conveniently such that oscillation relative movement between the two members will be resisted at and above a predetermined frequency limit but will be permitted at frequencies below such limit.

The arrangement of the surfaces of the two members cooperating with the liquid drop may vary, but it will often be convenient for the shapes of the surfaces to be such that a plane containing a line of shortest distance between the surfaces and extending in the direction of relative movement intersects the portion of one of the surfaces adjacent to the said line of shortest distance in a straight line and the adjacent portion of the other surface in a curve convex towards such straight line. In such case, conveniently, the chord of the convex curve across the portion of the curve in contact with the liquid drop is greater than the diameter of a free globule of liquid containing the same quantity of liquid as the liquid drop. For instance, the surface of one of the two members may be plane, whilst the surface of the other member has a generally dome-shaped portion convex towards such plane, and it will be clear that in such case the arrangement is operative for any direction of relative movement parallel to such plane. Preferably, in such case the generally dome-shaped portion of the second member is adjustable towards and away from the plane surface of the other member, in order to enable the length of the shortest distance between the surfaces to be adjusted to suit practical requirements.

In another convenient arrangement, one of the two members is surrounded by the other member, the position of shortest distance between the surfaces of the two members extending continuously around the inner member, so that the liquid drop is of annular formation. Thus, the surface of one of the two members may be cylindrical with its generators extending in the direction of relative movement, whilst the other member has a generally toroidal surface.

Figure 2:
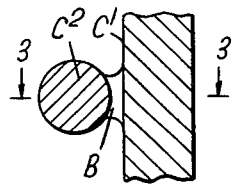
Figure 3:
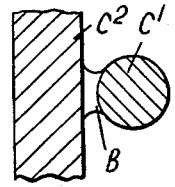
Figure 5:
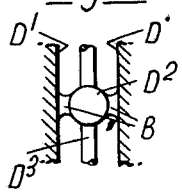
Figure 6:
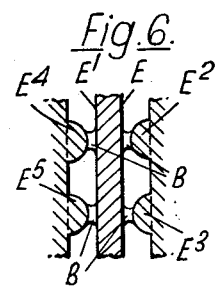
Figure 7:
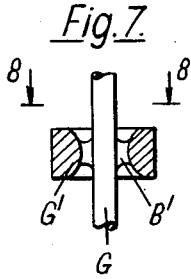
Figure 8:
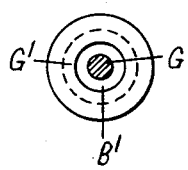
Figure 9:
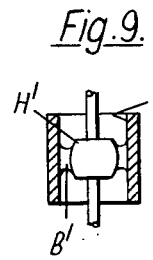
Figure 10:
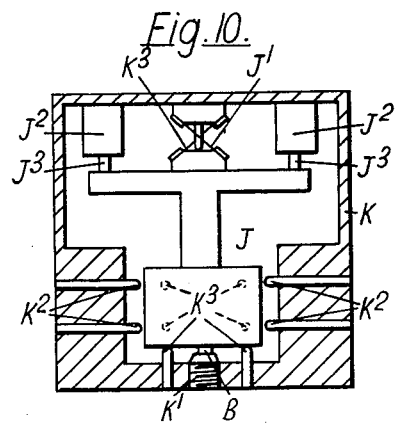
Figure 11:
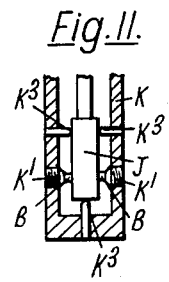
Figure 12:
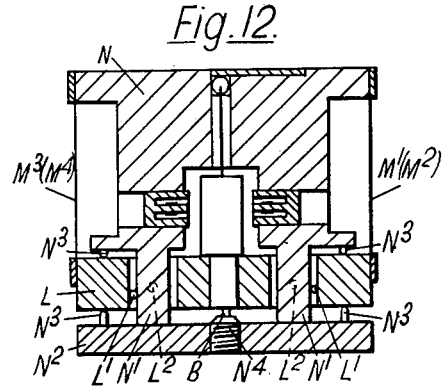
Figure 13:
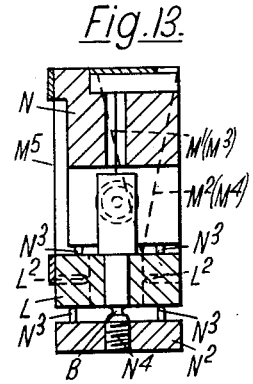
Figure 14:
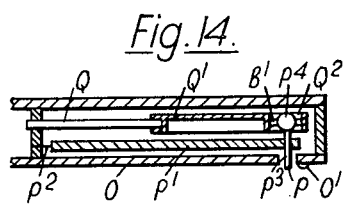
Figure 15:
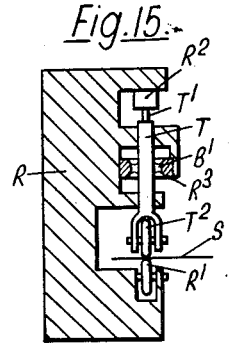

The invention may be carried into practice in various ways, but some convenient alternative arrangements of viscous coupling device according thereto, and also some useful practical applications thereof, are illustrated by way of example in the accompanying drawings, in which FIGURE 1 is a sectional view of one simple arrangement taken in a plane parallel to the direction of relative movement, FIGURE 2 is a similar view of another arrangement, FIGURE 3 is a transverse sectional view taken on the line 3—3 of FIGURE 2, FIGURES 4, 5 and 6 are views similar to that of FIGURE 1 respectively of three further alternative arrangements, FIGURE 7 is a sectional view similar to that of FIGURE 1 of an arrangement, in which one of the two relatively movable members annularly surrounds the other member, FIGURE 8 is a transverse sectional view of the arrangement of FIGURE 7 taken on the line 8—8 of FIGURE 7, FIGURE 9 is a view similar to that of FIGURE 1 of another arrangement in which one of the two members annularly surrounds the other, FIGURE 10 is a vertical section through an apparatus for precision measurement of level, incorporating an arrangement according to the present invention for damping the movement of the pendulum therein, FIGURE 11 is a vertical section (at right angles to that of FIGURE 10) of a similar level measuring apparatus incorporating a modified damping arrangement according to the present invention, FIGURES 12 and 13 are vertical sections at right angles through an alternative form of level measuring apparatus, incorporating a damping arrangement according to the present invention, FIGURE 14 is a longitudinal section through apparatus for measuring surface roughness, incorporating an arrangement according to the present invention for transmitting the movements of the stylus of such apparatus to a detector device, and FIGURE 15 is a sectional view through apparatus for measuring the thickness of the metal sheet in a rolling mill, incorporating an arrangement according to the present invention for preventing risk of shock damage to such apparatus.

In the simple arrangement shown in FIGURE 1, one of the two relatively movable members has a plane surface $A^1$ extending parallel to the direction of relative movement, whilst the second member has a generally dome-shaped surface $A^2$ convex towards such plane. Such dome-shaped surface $A^2$ may be quite small and may consist merely of the surface of a small button suitably mounted on the second member, or alternatively may consist of a portion of a larger surface, for example a spherical surface. The convex surface $A^2$ is mounted at only a small distance from the plane surface $A^1$ and the space between it and the plane surface in the neighbourhood of the vertex of the convex surface is occupied by a drop B of viscous liquid which spreads itself over a small rear of both surfaces with a much narrower waist between the two small areas. The spacing between the two surfaces $A^1$ and $A^2$ should be chosen so that the size of the area of contact of the liquid drop with the convex surface $A^2$ is such that its circular perimeter has a diameter greater than the initial diameter of the free globule of liquid before being put in place between the two surfaces. The liquid drop B is held in position by its surface tension in the manner well-known in itself, and if the drop is not initially placed right at the vertex of the convex surface $A^2$ lying nearest to the plane surface $A^1$, its surface tension will cause the drop to creep along the surface until it does occupy a position including the line of shortest distance between the two surfaces.

In describing the operation of the device, it will be assumed for convenience that the convex surface $A^2$ is held stationary and that the plane surface $A^1$ moves past it in its own plane, but it will be apparent that exactly the same action will take place with the plane surface fixed and the convex surface movable in a direction parallel to the plane surface. As the plane surface $A^1$ moves it will tend to drag the liquid drop with it and the layers of the liquid will flow over one another, thus, owing to the viscosity of the liquid, imposing an internal shear stress on the liquid which resists the movement of the plane surface $A^1$. The magnitude of the shear stress and therefore of the resistive force, depends on the velocity of the movement and increases with increase of velocity. As the velocity falls away as the plane surface $A^1$ is coming to rest, so also does the shear stress decrease, and if the plane surface remains in the displaced position the shape of the liquid drop B will be distorted and the surface tension comes into play to cause the liquid drop to creep along the plane surface to reestablish the drop adjacent to the position of shortest distance between the two surfaces. Such creepage due to surface tension will apply a temporary small force to the movable member, but in practice such force soon falls to a value which can be ignored.

It will be appreciated that if the displacement of the movable member is too large for the size of the drop, the drop may temporarily disrupt. In order to prevent this, the size must be greater than the desired movement, and it is desirable to provide stops to limit the extent of movement. A practical example, incorporating such stops, will be described later with reference to FIGURE 10. It is of course also desirable to relate the spacing between the surfaces and the viscosity, so that the shear stress set up within the drop B is sufficient to apply the required damping force resisting the movement.

Usually, the movement of the movable member will be oscillatory or will include an oscillatory component so that it will tend to return to its initial position after being brought to rest with the aid of the resistive force, and such return movement will likewise be opposed by a resistive force due to the shear stress set up in the liquid by the movement. Thus the oscillatory movement will quickly be damped out by the action of the drop. The higher the amplitude of oscillation, the greater will be the velocity of movement and therefore also the greater the damping force resisting such movement.

It is desirable in practice to make the distance between the two surfaces adjustable, for example by mounting the dome-shaped portion in screwthreaded engagement with the main body of the member carrying it, whereby the degree of damping can be chosen to suit requirements (see, for example, FIGURE 10, to be described later).

It will be appreciated that the foregoing arrangement can be modified in various ways. For example, the plane surface $A^1$ can be replaced by a cylindrical surface having its generators parallel to the direction of relative movement. Further, when such a cylindrical surface $C^1$ (FIGURES 2 and 3) is used, the convex surface may be in the form of another cylindrical surface $C^2$ with its generators at right angles to the direction of relative movement, for the important point is that such surface should be convex in the plane parallel to the direction of movement through the line of shortest distance between the two surfaces. It should be noted, however, that it is not satisfactory to use a cylindrical surface in combination with a plane surface, even when the generators of the cylindrical surface are at right angles to the direction of relative movement, for the liquid drop will be free to creep laterally along such cylindrical surface and indeed will do so if there is the slightest error in parallelism between the generators of the cylindrical surface and the plane surface.

Figure 4:
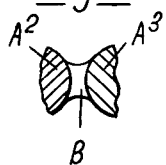

In another modification, shown in FIGURE 4, the plane surface $A^1$ is replaced by a second generally dome-shaped surface $A^3$, so that there are two such surfaces $A^2$ and $A^3$ convex towards one another. Such an arrangement, however, increases risk of disruption of the liquid drop B, unless the total permissible relative movement is limited to a very small value, and it will usually be preferable for one of the two surfaces to be substantially straight in the direction of relative movement.

It will also be clear that more than one liquid drop may be used. Thus, if one member has a plane surface, the other member may carry a number of convex buttons, spaced apart and each having the same spacing from the plane surface. In such case the damping force exerted on the moving member will be multiplied by the number of liquid drops used. It will sometimes be preferable to adopt a symmetrical arrangement, if the first member is bounded by two parallel plane surfaces, the second member then having one or more pairs of convex buttons engaging respectively with the opposite plane faces of the first member. Two such arrangements are shown respectively in FIGURES 5 and 6.

In the arrangement of FIGURE 5, one of the two members has two parallel plane surfaces D and $D^1$, facing one another, whilst the second member has a spherical surface $D^2$ and is mounted symmetrically between the two plane surfaces D, $D^1$, such second member being supported by a rod $D^3$. In this example, there are two liquid drops B located respectively between the surfaces D and $D^2$ and between the surfaces $D^1$ and $D^2$.

In the arrangement of FIGURE 6, one of the two members has two parallel plane surfaces E and $E^1$ and is located between two portions of the second member. One of such portions of the second member carries two dome-shaped surfaces $E^2$, $E^3$ projecting towards the plane surface E, whilst the other portion of the second member likewise carries two dome-shaped surfaces $E^4$, $E^5$ projecting towards the plane surface $E^1$. The arrangement is symmetrical, and there is a liquid drop B between each of the four dome-shaped surfaces and the adjacent plane surface.

In an alternative group of arrangements, one of the two relatively movable members surrounds the other and the position of shortest distance between the two surfaces in the direction of relative movement is arranged to extend continuously around the inner member, so that the liquid drop itself also extends continuously around such member and is of annular formation.

In one such arrangement, shown in FIGURES 7 and 8, the inner member is in the form of a cylindrical rod G with its generators parallel to the direction of relative movement, and the outer member is of generally toroidal form $G^1$ and symmetrically surrounds the rod. The position of shortest distance thus lies in a plane at right angles to the axis of the cylindrical rod G through the circular axis of the toroidal surface $G^1$. The area of contact of the liquid drop $B^1$ with the rod G will consist of a parallel-edged band of substantial width around the rod, and the area of contact of the liquid drop $B^1$ with the toroidal surface $G^1$ will likewise consist of a band of somewhat less width, whilst the smallest thickness of the annular drop B¹ will be considerably less than the width of either of such bands.

The operation of this device is generally analogous to that above described. Thus movement of the rod G through the toroidal surface G¹ or movement of the toroidal surface along the rod, will cause cylindrical layers of the liquid drop B¹ to flow over one another and will thus set up an internal shear stress in the liquid, which will give the desired resistive force for damping the movement of the movable member. In this case, too, there may be two or more similar annular liquid drops spaced apart along the length of the rod, the corresponding toroidal surfaces all being carried by the outer member.

This arrangement may be modified, as shown in FIGURE 9, by making the surface H of the outer member cylindrical, whilst the inner member carries a sphere or an outwardly convex toroidal surface H¹, or alternatively two or more such spheres or toroidal surfaces spaced apart along the length of the cylindrical surface of the outer member, the generators of such cylindrical surface again being parallel to the direction of relative movement.

In the foregoing description, it has been assumed that one of the two members is held against movement in the operative direction and that the other member moves along or past it. If, however, in any of the arrangements above described, both members are arranged to be movable in the operative direction, the liquid drop (or drops) will provide an efficient coupling device between the two members, so that a drive imparted to one member will be transmitted through the liquid drop to the other member. Thus, as soon as the first member begins to move, the layers in the liquid drop will begin to flow over one another and set up the internal shear stress in the liquid, and this will in turn apply a force to the second member tending to drag such second member in the same direction as the movement of the first member. As soon as such applied force becomes big enough to overcome the frictional or other resistance of the second member to movement, such second member will move and will by its movement tend to reduce the shear force. This arrangement is especially useful when the movement imparted to the first member is an oscillatory movement of small amplitude. In practice there is a minimum limit to the frequency at which the coupling is effective, and the device will operate efficiently to transmit movements of frequency above such frequency limit, which depends on the viscosity, shape and size of the liquid drop (or drops) and on the resistance to movement of the second member.

The device according to the invention finds useful application as a damping device for apparatus for the precision measurement or indication of level, intended to be used in much the same manner as an ordinary spirit level, but giving a far higher degree of accuracy, for example one second of arc.

One example of such apparatus is indicated in FIGURE 10, wherein a pendulum J is pivotally suspended within a casing K from a hinge device comprising a pair of cross ligaments J¹ and carries the moving members J³ of two transducers J² on opposite sides of the hinge axis, the casing K resting on the surface whose level is to be tested. The transducers J² may take various forms, but in the form shown each consists of a magnetic pot into which a rod-like moving member J³ protrudes to a greater or less extent, thus varying the inductance of a coil linked with the magnetic circuit. Thus, as the pendulum J moves, the inductance of one transducer coil increases and that of the other decreases, the electrical outputs of the two coils being combined for example in a bridge circuit, to operate a measuring or indicating instrument (not shown).

In such apparatus, it is important to provide an efficient damping device, to ensure that the pendulum will come quickly to rest in its new position when the casing K is tilted through a small angle from its true level position. For precision measurement, for which such apparatus is intended, the maximum movement of the pendulum is very small, and the device according to the present invention is very suitable for providing the desired damping.

In the preferred construction, the pendulum has plane side surfaces parallel to the direction of movement and a bottom surface, which may be flat or curved for example about a centre corresponding to the position of the hinge axis. The arrangement according to the present invention is applied thereto by providing on the casing K one or more convex buttons K¹ either adjacent to the bottom surface of the pendulum J as shown in FIGURE 10 or adjacent to each of the plane side surfaces of the pendulum J as shown in FIGURE 11, so that the liquid drop or drops B between such button or buttons and the surface of the pendulum will exert the desired damping force thereon. Each such button K¹ is preferably adjustably mounted on the casing K, for example by means of a screwthread as shown, to enable the distance between the button and the pendulum surface to be adjusted to provide a desired degree of damping of the pendulum movement. It is desirable to provide adjustable stops K² on the casing to limit the amount of movement of the pendulum in the operative direction, and also further stops K³ for substantially preventing any movement of the pendulum in directions other than the operative direction.

FIGURES 12 and 13 show an improved form of such apparatus, forming the subject of the copending United States patent application Serial No. 103,462, filed April 17, 1961, now Patent No. 3,081,552, wherein instead of utilising a hinged pendulum a body suspended from the casing by means of a five-wire suspension device is employed, so that such body will perform a translational, rather than a rotational, movement. In a preferred construction, the five wires M¹, M², M³, M⁴, M⁵ for suspending the moving body L are anchored to a framework N supported by means of two brackets N¹ projecting upwardly through openings in the suspended body L from the base plate N² of the casing. Whilst other arrangements may be employed, the five wires are preferably arranged in three planes lying at right angles to the direction of operative movement of the suspended body. Two of the wires M¹, M² are arranged in V-formation in one of such planes, and two more of the wires M³, M⁴ are similarly arranged in V-formation in a second plane, whilst the fifth wire M⁵ is in the third plane between the first two planes in a position remote from the line joining the apices of the two V's. The two V's constitute a parallel linkage suspension for the body L, whilst the fifth wire prevents rotation of the body about the line joining the apices of the two V's. The body L is thus constrained, so as to be free to swing only in a generally horizontal direction parallel to its front and rear faces, the range of movement in the operative direction being limited by the framework brackets N¹, adjustable stops L¹ carried by the suspended body being provided for engaging with such brackets. The movable body also carries adjustable stops L² engaging with the front and rear surfaces of the brackets N¹ to prevent any movement of the body in a horizontal direction at right angles to the operative direction, whilst the framework N and the base plate N² carry stops N³ for substantially preventing any upward or downward movement of the body L. In the example shown, the movement of the suspended body L is damped by means of a liquid drop B between the lower surface of the body and a convex button N⁴ adjustably carried by the base plate N², but it will be clear that such damping could be effected, if preferred, in a manner similar to that shown in FIGURE 11 by providing convex buttons adjacent to the front and rear surfaces of the suspended body with liquid drops between such buttons and the body surface.

It is of interest to note in connection with the arrangements of FIGURES 10–13 that if the apparatus is stored on its side when out of use, the liquid drop B will displace itself relatively to the axis of the button $K^1$ or $N^4$ until the resultant surface tension force in the plane of the surface of the suspended body due to the difference in radii of the air surfaces of the drop above and below such axis is equal to the mass of the drop. On restoring the apparatus to its erect position, there will be a force equal to the weight of the drop trying to bias the suspended body to the other side of its true zero position. This force dissipates itself with time as the drop creeps back to its correct position. In practice, it is found that a drop arranged as above mentoned will resume its correct position almost as quickly as the apparatus can be bedded down on the test surface, so that the delay may be regarded as negligible.

As an example of practical application of the device according to the invention to a viscous coupling for transmitting movement from one member to the other, may be mentioned its use in the pick-up head of apparatus for measuring or indicating surface roughness. In such apparatus a stylus is traversed over the test surface whose roughness is to be measured, and the working movements of the stylus approximately normal to the test surface during such traversing are utilised to control a transducer whose electrical output is amplified and passed to an indicating instrument. Such instrument may have the form of an integrating meter giving an average reading of the roughness over a predetermined length of the test surface traversed at constant speed. The pick-up head in one convenient construction of such apparatus is shown in FIGURE 14, such pick-up head being in the form of a tube O, which is pivoted to the traversing mechanism (not shown) and carries a rounded skid $O^1$, which rides along the surface under test and engages with such surface over a substantial area, thus affording a datum with respect to which the working movements of the sharp stylus P are measured. The stylus P is carried by a stylus arm $P^1$ pivoted by means of a ligament hinge $P^2$ to the pick-up head O. In the example illustrated, the transducer responsive to the working movements of the stylus is in the form of a piezo-electric crystal Q, one end of which is secured to the pick-up head O, conveniently in a position adjacent to the pivot $P^2$ of the stylus arm, whilst its other end is coupled to the stylus. The device according to the present invention affords a satisfactory coupling between the stylus and the crystal. In the example illustrated, the free end of the piezo-electric crystal Q carries an extension arm $Q^1$ having a vertical cylindrical hole $Q^2$ immediately above the stylus P. A vertical rod $P^3$, which constitutes the connection from the stylus P to the stylus arm $P^1$, is formed with a spherical upper end $P^4$ lying within the cylindrical hole $Q^2$ in the extension arm $Q^1$ from the crystal Q. An annular drop $B^1$ of viscous liquid is provided around such spherical surface within the cylindrical inner surface of the hole $Q^2$, thus constituting a viscous coupling device according to the present invention between the stylus and the piezoelectric crystal, whereby the relatively rapid working movements of the stylus P during traversing along the test surface are transmitted by the liquid drop $B^1$ to the extension arm and thereby cause flexure of the crystal Q, whose electrical output is amplified to control the desired indication of surface roughness. The dimensions of the cooperating parts are preferably so chosen that the liquid drop will transmit the higher frequency movements of the stylus due to the roughnesses of the surface, but will not transmit the lower frequency periodic undulations of the surface, due for example to finishing operations.

The incorporation of this form of coupling makes it possible, if desired, to house the stylus arm and crystal within a long tubular pick-up casing of very small diameter, say a quarter of an inch, so that the pick-up head can be inserted into small bores for measurement of the roughness of the internal surfaces thereof.

Another practical use of the device according to the invention, for restraining shock, is in apparatus for gauging the thickness of metal sheet in rolling mills. In such apparatus, as illustrated in FIGURE 15, a frame R carrying a roller $R^1$ engaging with the underside of the metal sheet S also carries a transducer $R^2$, whose moving element $T^1$ is mounted on a vertical rod T carrying a roller $T^2$ engaging with the upper surface of the sheet S, the electrical output of the transducer $R^2$ being utilised to control an indicating instrument for indicating the thickness of the metal sheet S. There is risk of damage to such gauging apparatus, if the metal sheet is suddenly withdrawn from between the gauging rollers $R^1$ and $T^2$. The impact can be reduced with the aid of the device according to the present invention, by mounting a ring $R^3$ having an inwardly convex toroidal surface on the frame R around the vertical rod T connecting the upper gauging roller $T^2$ to the moving member $T^1$ of the transducer $R^2$, with an annular drop $B^1$ of viscous liquid between such toroidal surface and the cylindrical surface of the rod T. The liquid drop will then exert a strong resistive force against sudden movement of the rod, when the metal sheet is withdrawn from between the gauging rollers, and will cause the rod to move relatively gradually and smoothly to its new position, without risk of damage.

It will be appreciated that the foregoing examples of practical applications of the viscous coupling device according to the present invention are merely illustrative of a variety of practical uses of the device, and likewise that the viscous coupling device itself may be constructed in ways other than those described, within the scope of the invention.

In all arrangements according to the invention, it is important to choose a liquid of adequately high viscosity to provide the desired damping or resistive force, the surface tension of the liquid being called upon only for holding the liquid drop properly in position. A suitable liquid is a silicone fluid of more than a few thousand centistokes viscosity, for example 50,000 or 100,000 centistokes.

What we claim as our invention and desire to secure by Letters Patent is:

1. In precision apparatus having two members mounted to permit small translational movements by at least one of said members relative to the other, a damping device for resisting such relative translational movement comprising a drop of viscous liquid located between shaped portions of two adjacent surfaces respectively on the two members, said drop having a diameter greater than said permitted translational movement, one of the two surfaces comprising a portion having straight generators extending in the direction of relative movement and the other surface having a small projection convex toward said portion but spaced slightly therefrom, whereby the two surfaces are closer together at the position of the convex projection than at neighboring positions on either side thereof in the direction of relative movement, the drop of viscous liquid being anchored by surface tension in position relatively to the said convex projection and being distorted in shape when said small translational relative movement takes place and thereby subjected to shear stress which, by virtue of the viscosity of the liquid, resists the relative movement.

2. Precision apparatus as claimed in claim 1, including stops for limiting the extent of the translational relative movement between the two members in the direction of such movement to a distance less than the size of the drop.

3. Precision apparatus as claimed in claim 1, in which one of the two surfaces between which the liquid drop is located is plane and the other has a generally dome-shaped projection convex to such plane surface, the portion of such dome-shaped projection in contact with the liquid drop having, in the cross-sectional plane which is at right angles to the said plane surface and extends in the direction of the translational relative movement, a chord length greater than the diameter of a free globule of liquid containing the same quantity as the liquid drop.

4. Precision appartus as claimed in claim 1 in which the small convex projection on one of the said two surfaces is formed separately from such surface and is mounted thereon so as to be adjustable towards and away from the other of the two surfaces.

5. Precision apparatus for indicating any slight tilt of a nominally level surface, comprising a casing for resting on the nominally level surface to be tested, a member which is suspended from the casing and has a surface adjacent to a surface of the casing past which the suspended member will perform effectively translational movement through a small distance in response to the said slight tilt, one of the said two adjacent surfaces being plane and extending in the direction of such translational movement, and the other of such surfaces having a small projection convex towards such plane surface, and means for damping the relative translational movement between the two surfaces comprising a drop of viscous liquid having a diameter greater than said small distance, said drop being located between the said convex projection and the adjacent plane surface and anchored to such convex projection by surface tension so that, when the small translational relative movement takes place, said drop will be distorted in shape by such relative movement and thereby subjected to shear stress which by virtue of the viscosity of the liquid resists the relative movement.

6. Precision apparatus as claimed in claim 5, including stops for limiting the extent of the translational relative movement between the two members in the direction of such movement to a distance less than the size of the drop.

7. Precision apparatus as claimed in claim 5, in which the portion of the said small convex projection in contact with the liquid drop has, in that cross-sectional plane which is at right angles to the said plane surface and extends in the direction of the translational relative movement, a chord length greater than the diameter of a free liquid globule containing the same quantity of liquid as the liquid drop.

8. Precision apparatus as claimed in claim 5, in which the small convex projection on one of the said two surfaces is formed separately from such surface and is mounted thereon so as to be adjustable towards and away from the other of the two surfaces.

References Cited by the Examiner
UNITED STATES PATENTS

| | | | |
|---|---|---|---|
| 1,860,740 | 5/32 | Hayes. | |
| 1,951,578 | 3/34 | Peters. | |
| 2,294,320 | 8/42 | Ritzmann | 324—125 |
| 2,408,392 | 10/46 | Gillum et al. | 73—430 |
| 2,514,140 | 7/50 | O'Connor | 118—1 |
| 2,569,311 | 9/51 | Hoare et al. | 73—430 |
| 2,596,019 | 5/52 | Fisher | 324—92 |
| 2,719,264 | 9/55 | Murray | 324—97 |
| 2,775,317 | 12/56 | Sinisterra | 188—1 |
| 2,779,442 | 1/57 | Bacon | 188—90 |
| 2,867,706 | 1/59 | Statham | 188—1 X |
| 2,998,868 | 9/61 | Meier | 188—90 |
| 3,102,233 | 8/63 | Charbonneaux | 324—124 |

ARTHUR L. LA POINT, *Primary Examiner.*

THOMAS J. HICKEY, *Examiner.*